(12) United States Patent
Hamada

(10) Patent No.: US 9,538,067 B2
(45) Date of Patent: Jan. 3, 2017

(54) IMAGING SENSOR CAPABLE OF DETECTING PHASE DIFFERENCE OF FOCUS

(71) Applicant: Samsung Electronics Co., Ltd., Suwon-si, Gyeonggi-do (KR)

(72) Inventor: Masataka Hamada, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 14/600,426

(22) Filed: Jan. 20, 2015

(65) Prior Publication Data

US 2016/0044229 A1 Feb. 11, 2016

(30) Foreign Application Priority Data

Aug. 5, 2014 (KR) .................. 10-2014-0100698

(51) Int. Cl.
| | |
|---|---|
| *H04N 5/232* | (2006.01) |
| *G02B 7/36* | (2006.01) |
| *G02B 7/34* | (2006.01) |
| *H04N 5/369* | (2011.01) |
| *H04N 9/04* | (2006.01) |

(52) U.S. Cl.
CPC .......... *H04N 5/23212* (2013.01); *G02B 7/346* (2013.01); *G02B 7/36* (2013.01); *H04N 5/3696* (2013.01); *H04N 9/045* (2013.01)

(58) Field of Classification Search
CPC ........ G02B 7/346; H02B 7/36; H04N 5/23212
See application file for complete search history.

(56) References Cited

U.S. PATENT DOCUMENTS

| 8,749,696 | B2 | 6/2014 | Goto | |
|---|---|---|---|---|
| 2007/0263904 | A1* | 11/2007 | Muramatsu | ............ G03B 15/16 382/107 |
| 2009/0153666 | A1* | 6/2009 | Takeuchi | .............. G01S 3/7864 348/169 |
| 2011/0310280 | A1 | 12/2011 | Goto | |
| 2012/0147238 | A1 | 6/2012 | Kita et al. | |
| 2013/0088621 | A1 | 4/2013 | Hamada | |

(Continued)

FOREIGN PATENT DOCUMENTS

| JP | 2012003080 A | 1/2012 |
|---|---|---|
| KR | 10-2013-0038035 A | 4/2013 |

*Primary Examiner* — Amy Hsu
(74) *Attorney, Agent, or Firm* — Jefferson IP Law, LLP

(57) ABSTRACT

An imaging device including 2-dimensionally arranged pixels for receiving light is provided. The imaging device includes a first area configured to detect a horizontal phase difference based on horizontal phase difference information obtained from pixels configured to detect the horizontal phase difference, a second area configured to detect a vertical phase difference based on vertical phase difference information obtained from pixels configured to detect the vertical phase difference, and a third area configured to detect horizontal and vertical phase differences based on horizontal phase difference information and vertical phase difference information obtained from pixels configured to detect the horizontal and vertical phase differences, wherein the first area is adjacent to a horizontal border of the third area, wherein the second area is adjacent to a vertical border of the third area, and wherein the third area is located at a center of the imaging device.

9 Claims, 21 Drawing Sheets

(56) References Cited

U.S. PATENT DOCUMENTS

| | | | |
|---|---|---|---|
| 2013/0335606 A1 | 12/2013 | Aoki et al. | |
| 2014/0016021 A1* | 1/2014 | Uchida | G03B 13/36 |
| | | | 348/353 |
| 2014/0043508 A1 | 2/2014 | Kawamura et al. | |
| 2014/0071131 A1 | 3/2014 | Kitago | |
| 2014/0092272 A1* | 4/2014 | Choi | H04N 5/23293 |
| | | | 348/222.1 |
| 2014/0340565 A1* | 11/2014 | Kitani | H04N 5/23212 |
| | | | 348/349 |
| 2015/0022699 A1* | 1/2015 | Shimada | H04N 5/3696 |
| | | | 348/273 |

* cited by examiner

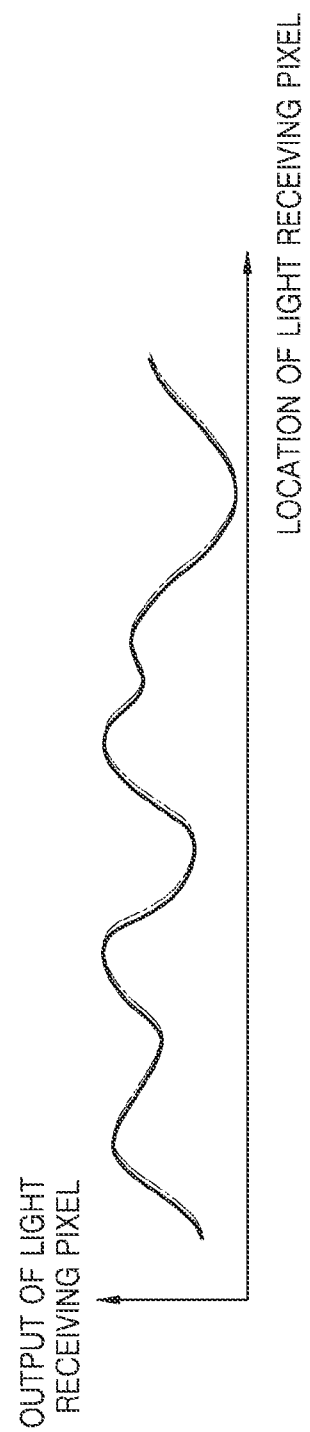

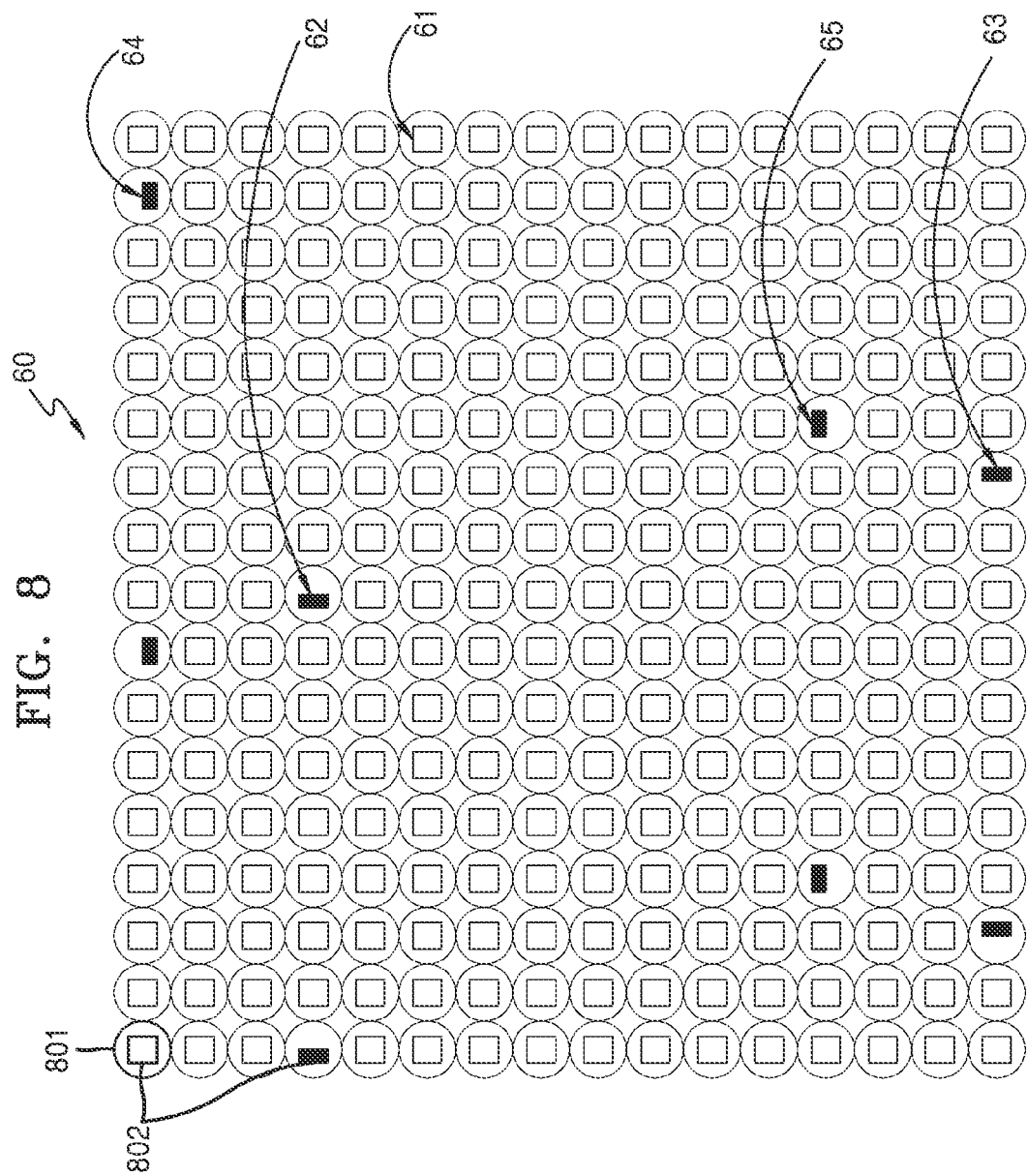

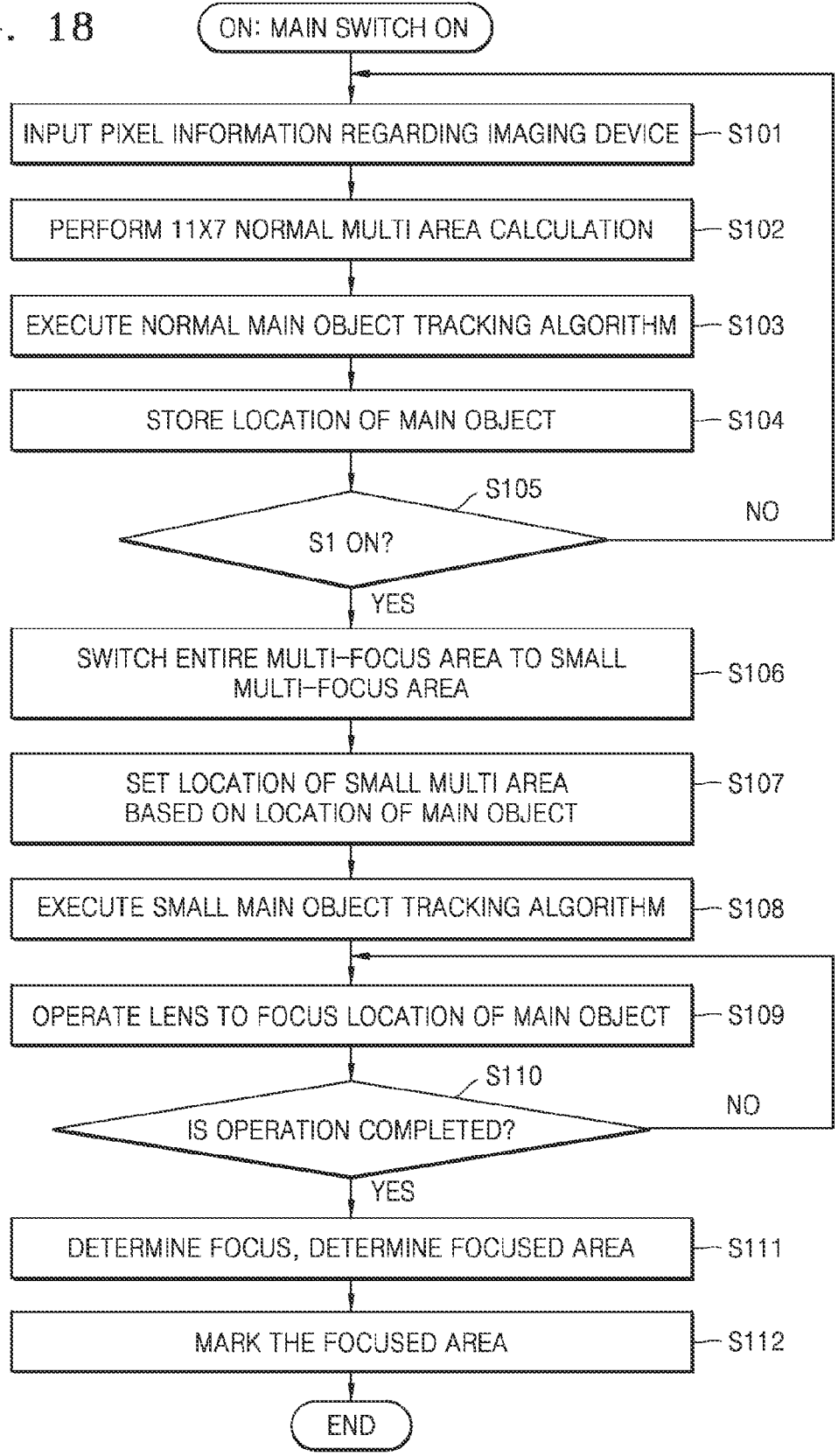

IMAGING SENSOR CAPABLE OF DETECTING PHASE DIFFERENCE OF FOCUS

CROSS-REFERENCE TO RELATED APPLICATION(S)

This application claims the benefit under 35 U.S.C. §119(a) of a Korean patent application filed on Aug. 5, 2014 in the Korean Intellectual Property Office and assigned Serial number 10-2014-0100698, the entire disclosure of which is hereby incorporated by reference.

TECHNICAL FIELD

The present disclosure relates to an imaging sensor. More particularly, the present disclosure relates to an imaging sensor capable of detecting phase difference of focus.

BACKGROUND

For a digital photographing apparatus to pick up, or in other words, to capture, a clear still image or moving pictures, it is needed to precisely focus on an object. Auto-focus techniques for automatically adjusting focus include a phase difference automatic focus adjusting technique, which may be referred to hereinafter as 'phase difference detection AF'.

Recently, phase difference detecting pixels capable of performing phase difference detection AF by using imaging pixels for inputting an image have been suggested.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is provide setup of a cross autofocus (AF) area as wide as possible in a screen image and focus detection throughout the entire screen image.

Additional aspects will be set forth in part in the description which follows and, in part, will be apparent from the description, or may be learned by practice of the presented embodiments.

In accordance with an aspect of the present disclosure, an imaging device is provided. The imaging device includes 2-dimensionally arranged pixels for receiving light, a first area configured to detect a horizontal phase difference based on horizontal phase difference information obtained from pixels configured to detect the horizontal phase difference, a second area configured to detect a vertical phase difference based on vertical phase difference information obtained from pixels configured to detect the vertical phase difference, and a third area configured to detect horizontal and vertical phase differences based on horizontal phase difference information and vertical phase difference information obtained from pixels configured to detect the horizontal and vertical phase differences, wherein the first area is adjacent to a horizontal border of the third area, wherein the second area is adjacent to a vertical border of the third area, and wherein the third area is located at the center of the imaging device.

In accordance with an aspect of the present disclosure, method of focusing an image by an imaging device including 2-dimensionally arranged pixels for receiving light is provided. The method includes determining a location of a main object included in an image to be captured, determining a location of a small multi-focus area based on the location of the main object, updating the location of the main object according to small multi-focus area, operating a lens of the imaging device to focus the location of the main object according to the small multi-focus area, and marking the focused location of the main object.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A and 3B are graphs for describing a phase difference of light receiving pixels according to an embodiment of the present disclosure;

FIG. 8 is a diagram showing an example arrangement of phase difference detecting pixels in an imaging device capable of detecting horizontal and vertical phase differences according to an embodiment of the present disclosure;

FIG. 18 is a flowchart showing an autofocus (AF) process using a small multi-focus area, such as the small multi-focus area of FIG. 17, according to an embodiment of the present disclosure.

Throughout the drawings, it should be noted that like reference numbers are used to depict the same or similar elements, features, and structures.

DETAILED DESCRIPTION

Figure 1:
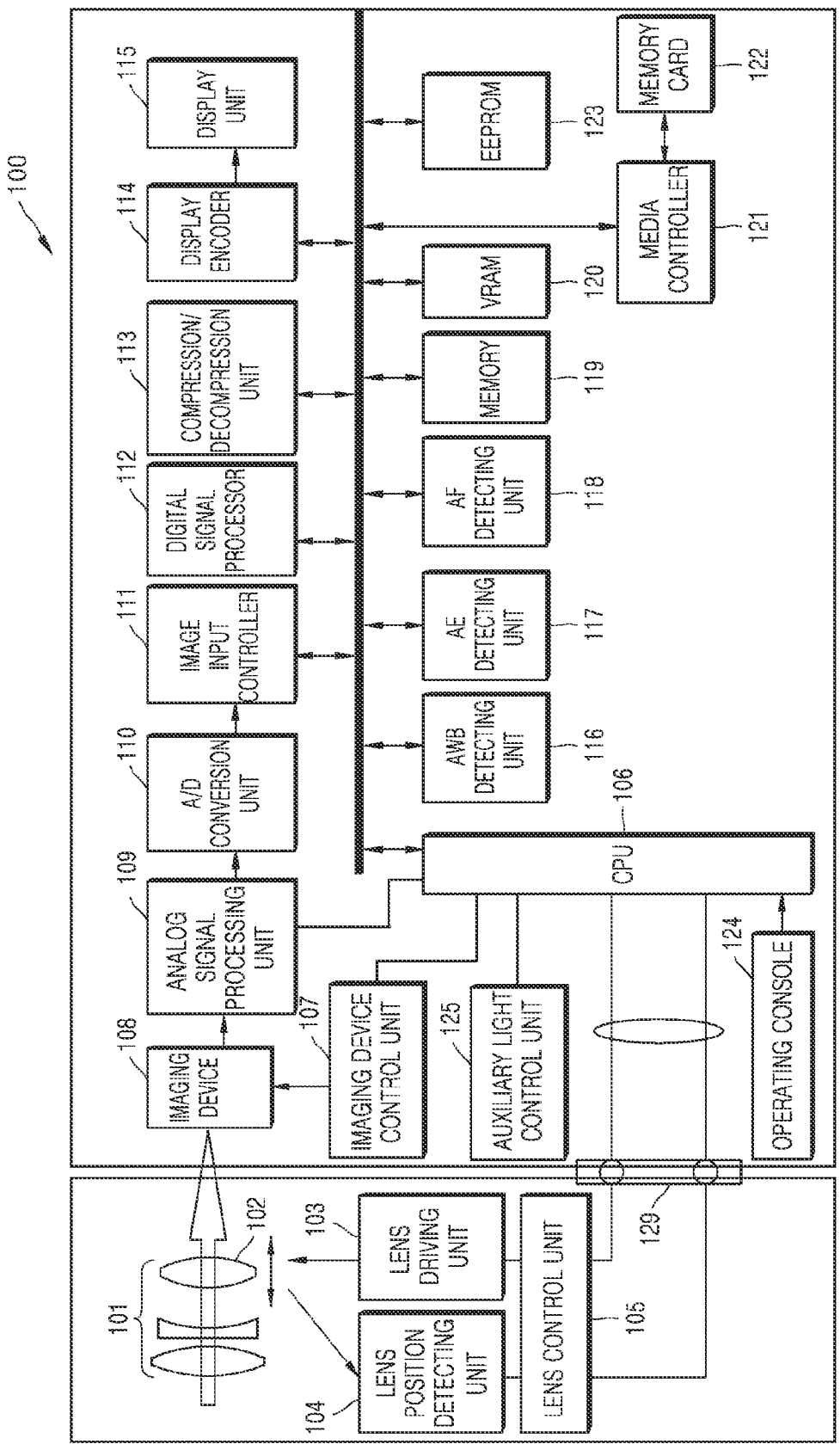
FIG. 1 is a block diagram showing a configuration of a digital image processing device including an imaging device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While such terms as "first", "second", etc., may be used to describe various components, such components must not be limited to the above terms. The above terms are used only to distinguish one component from another.

The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including" or "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

When a component is referred to as being "connected to" another component, it can not only be "directly connected," but also "electrically connected" across an intervening device. Furthermore, when a unit is referred to as "comprising" or "including" at least one component, it does not exclude other components unless stated otherwise and shall be referred to as comprising or including the other components.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. In the description of the present disclosure, certain detailed explanations of related art are omitted when it is deemed that they may unnecessarily obscure the essence of the disclosure. Like reference numerals denote like elements.

FIG. 1 is a block diagram showing a configuration of a digital image processing device including an imaging device according to an embodiment of the present disclosure.

FIG. 1 shows that a digital image processing device 100 and a lens may be detached from each other. Furthermore, by using the imaging device 108 according to the present embodiment, the digital image processing device 100 capable of performing phase difference autofocus (AF) and contrast AF may be embodied.

Referring to FIG. 1, the digital image processing device 100 includes an image pickup lens 101 including a focus lens 102. The digital image processing device 100 has a focus detection function and may drive the focus lens 102. The image pickup lens 101 includes a lens driving unit 103 for driving the focus lens 102, a lens position detecting unit 104 for detecting a position of the focus lens 102, and a lens control unit 105 for controlling the focus lens 102. The lens control unit 105 exchanges information regarding focus detection with a central processing unit (CPU) 106 of the digital image processing device 100.

The digital image processing device 100 includes an imaging device 108, thereby picking up light from an object transmitted through the image pickup lens 101 and generating an image signal therefrom. The imaging device 108 may include a plurality of photoelectric conversion units (not shown) arranged in a matrix shape and a transmission path (not shown) for reading out an image signal by moving charges from the photoelectric conversion unit.

An imaging device control unit 107 generates a timing signal and controls the imaging device 108 to pick up, or in other words, capture an image. Furthermore, when charge accumulations at respective scan lines are completed, the imaging device control unit 107 sequentially reads out image signals.

A read out signal is transmitted through an analog signal processing unit 109, is converted into a digital signal at an Analog to Digital (A/D) conversion unit 110, and is input to and processed by an image input controller 111.

A digital image signal input to the image input controller 111 is processed via at least one of an auto white balance (AWB) calculation, an auto exposure (AE) calculation, and an AF calculation by an AWB detecting unit 116, an AE detecting unit 117, and an AF detecting unit 118, respectively. Here, the AF detecting unit 118 outputs a detected contrast value during contrast AF and outputs pixel information to the CPU 106 during a phase difference AF operation for phase difference calculation. A phase difference calculation of the CPU 106 may be performed by performing a correlation calculation of a plurality of pixel column signals. As a result, a location or direction of focus may be obtained.

An image signal is also stored in a synchronous dynamic random access memory (SDRAM) 119, which may also be referred to as memory 119, which is a temporary memory. A digital signal processor 112 performs a series of image signal processes, such as gamma correction, and generates displayable live-view images and/or captured images. A compression/decompression unit 113 compresses image signals or decompresses image signals for reproduction in a compression format, such as a Joint Photographic Experts Group (JPEG) compression format or an H.264 compression format. An image file including image signals compressed by the compression/decompression unit 113 is transmitted to a memory card 122 via a media controller 121 and stored therein. Image data to be displayed is stored in a video random access memory (VRAM) 120, and a corresponding image is displayed on a liquid crystal display (LCD) 115, which may also be referred to as a display unit 115, via a display encoder 114. The CPU 106 controls the overall operations of the components. An electrically erasable programmable read-only memory (EEPROM) 123 stores and maintains information for correcting pixels defect of the imaging device 108 or information for adjusting the imaging device 108. An operating console 124 receives various commands from a user for operating the digital image processing device 100. The operating console 124 may include various buttons, such as a shutter-release button, a main button, a mode dial, a menu button, etc. The digital image processing device 100 may also include an auxiliary light control unit 125 for controlling an auxiliary light (not shown) to pick up and/or capture an image.

Figure 2:
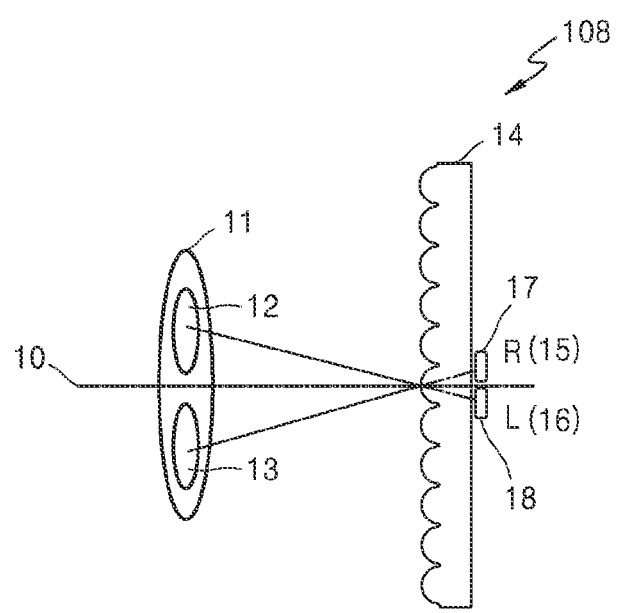
FIG. 2 is a diagram showing a mechanism of a phase difference detecting pixel using an imaging device, such as the imaging device of FIG. 1, according to an embodiment of the present disclosure.

FIG. 2 is a diagram showing the mechanism of a phase difference detecting pixel using an imaging device, such as the imaging device of FIG. 1, according to an embodiment of the present disclosure.

Referring to FIG. 2, light from an object transmitted through an imaging lens 11 passes through a micro lens array 14 and is guided to light receiving pixel R 15 and light receiving pixel L 16. Light screens 17 and 18, which may also be referred to as limited apertures, for limiting pupils 12 and 13 of the imaging lens 11 are arranged at portions of the light receiving pixel R 15 and the light receiving pixel L 16. Furthermore, light from the pupil 12 above an optical axis 10 of the imaging lens 11 is guided to the light receiving pixel L 16, whereas light from the pupil 13 below the optical axis 10 of the imaging lens 11 is guided to the light receiving pixel R 15. Guiding lights inversely projected at the pupils 12 and 13 by the micro lens array 14 to the light receiving pixel R 15 and the light receiving pixel L 16 are referred to as pupil division. Although FIG. 2 shows an example in which guiding lights are inversely projected in the imaging lens 11, guiding lights may be inversely projected to outside the image pickup lens 11.

Figure 3A:
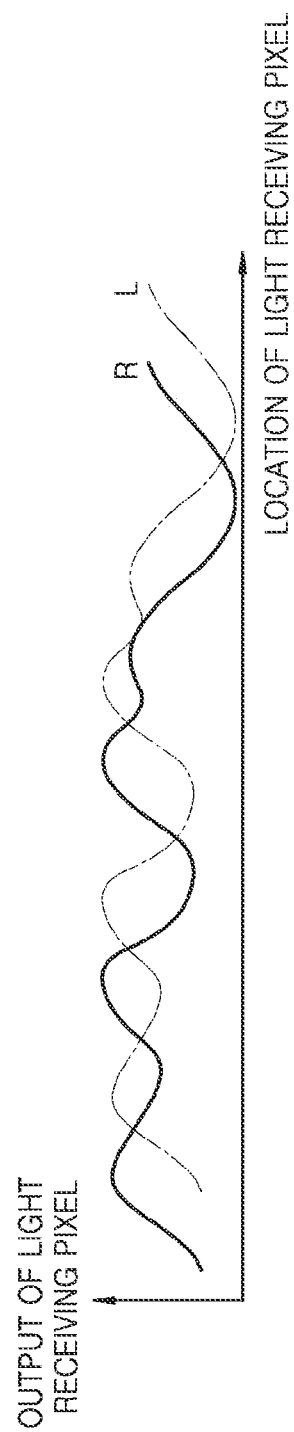

FIGS. 3A and 3B are graphs for describing a phase difference of light receiving pixels according to an embodiment of the present disclosure.

Referring to FIGS. 3A and 3B, continuous pupil divided pixel outputs of light receiving pixels of R and L columns according to micro-lens columns, are shown. In FIGS. 3A and 3B, the horizontal axis indicates locations of light receiving pixels, whereas the vertical axis indicates outputs of the light receiving pixels. In FIG. 3A, pixels outputs of an R column light receiving pixel and an L column light receiving pixel have a same shape. However, locations of pixel outputs, that is, phases of the pixel outputs differ in FIG. 3A. The reason for this is that locations at which images are formed by lights from the pupils 12 and 13, which may be eccentric pupils, of the imaging lens 11 differ from each other. Therefore, if the pupils 12 and 13 are not focused on an object, phases differ as shown in FIG. 3A. Meanwhile, if the pupils 12 and 13 are focused on an object, images are formed at a same location as shown in FIG. 3B. Furthermore, direction of a focus difference may be determined therefrom. A focused location in front of an object may be referred to as a front focus. In the case of a front focus, an R column is shifted left to a focused phase, whereas an L column is shifted right to the focused phase. On the contrary, a focused location beyond an object may be referred to as a rear focus. In the case of a rear focus, an R column is shifted right to a focused phase, whereas an L column is shifted left to the focused phase. FIG. 3A shows a front focus. If an R column and an L column are arranged opposite to those shown in FIG. 3A as the R column is shifted right to a focused phase and the L column is shifted left to the focused phase, it is a rear focus. Furthermore, a deviation of the R column and the L column may be converted into a focus deviation.

Figure 4A:
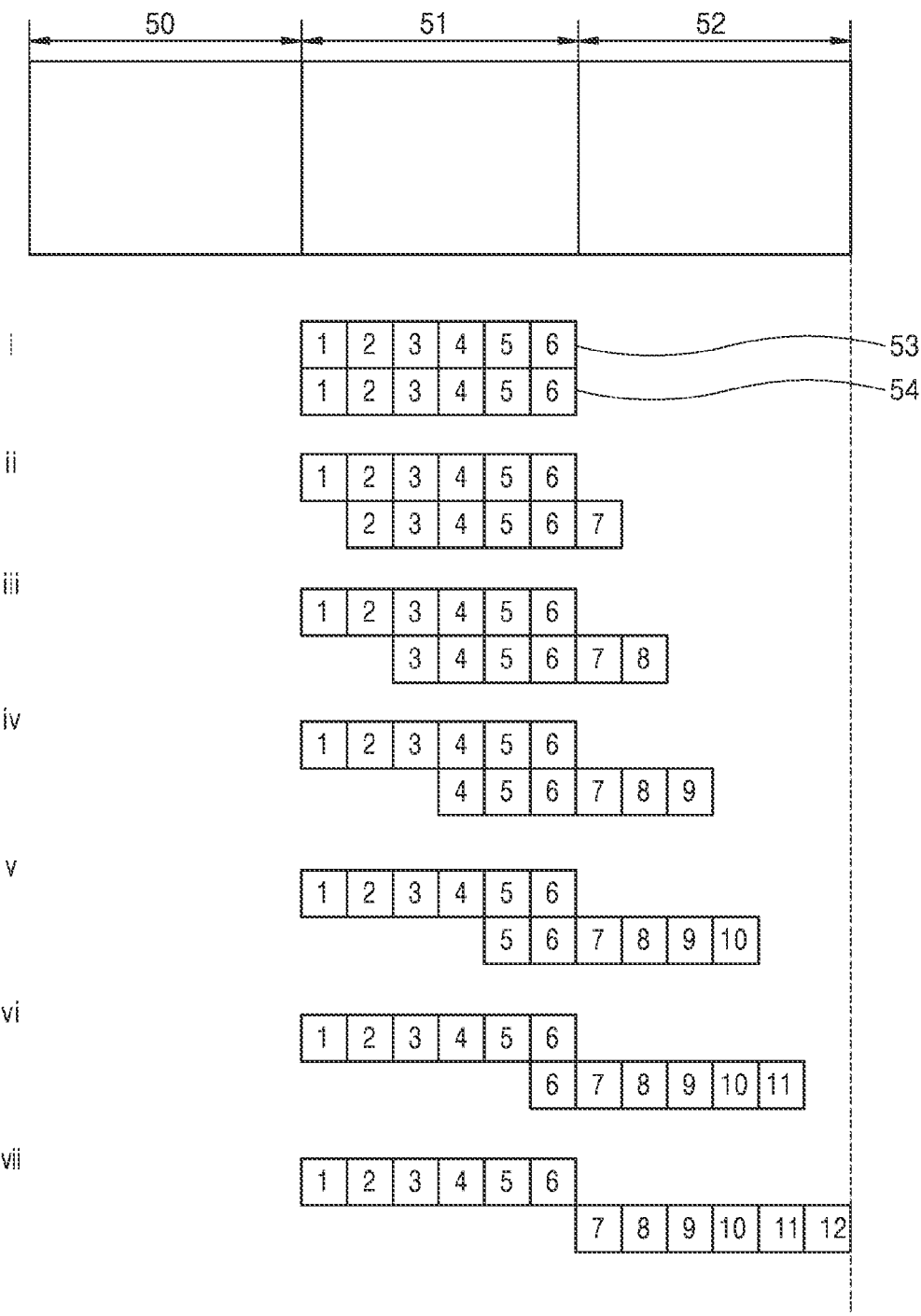
FIGS. 4A and 4B are perspective views for describing an actual correlation calculation for phase difference detection, such as shown in FIGS. 3A and 3B, according to an embodiment of the present disclosure.
Figure 4B:
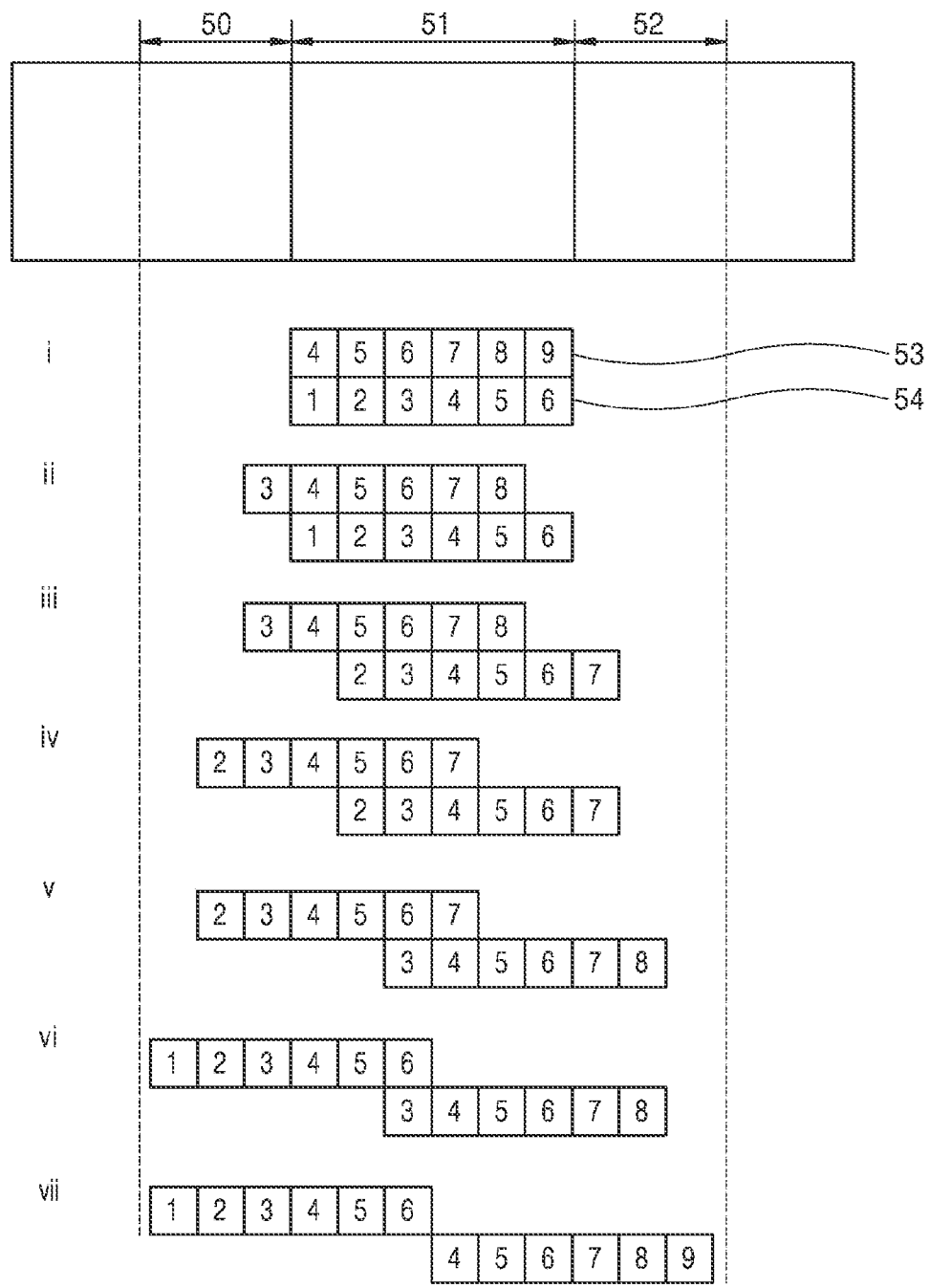

FIGS. 4A and 4B are perspective views for describing an actual correlation calculation for detecting a phase difference detection, such as shown in FIGS. 3A and 3B, according to an embodiment of the present disclosure.

FIGS. 4A and 4B show a technique (a) for shifting only a phase difference detecting pixel column R 54 from between a phase difference detecting pixel column L 53 and the phase difference detecting pixel column R 54, and a technique (b) for shifting both the phase difference detecting pixel column L 53 and the phase difference detecting pixel column R 54.

An area 51 is a focus detection area 51 displayed to a camera user. The phase difference detecting pixel column L 53 and the phase difference detecting pixel column R 54 perform correlation calculations by and/or according to 6 pixels. Although correlation calculations are performed by 6 pixels here, correlation calculations may actually be performed by 16 pixels or 24 pixels. A sum of absolute values of differences between the phase difference detecting pixel column L 53 and the phase difference detecting pixel column R 54 may be used as an evaluation value or a correlation value. A plurality of correlation values may be obtained by shifting positions for a correlation calculation by 1 pixel. Furthermore, a position X of YM corresponding to the smallest correlation value HFN(X) is a focused position XM. Since a correlated position is quantized, a quantization error is significant only with respect to a correlation calculation. In an actual calculation, an interpolation calculation is performed at a finer resolution by using quantization information to obtain a position XM corresponding to the smallest correlation value.

Referring to FIGS. 4A and 4B, a numeral i denotes a focused status for convenience of explanation. FIG. 4A shows that correlation values are calculated by shifting the phase difference detecting pixel column R 54 to the right by 1 pixel from i to vii. The numeral vii denotes a status with no correlation. Here, a correlation calculation area 52 has an exactly same length as the focus detection area 51. Although not shown, a correlation calculation may be performed by shifting the phase difference detecting pixel column R 54 to the left. Here, the phase difference detecting pixel column R 54 is shifted by 6 pixels in the opposite direction compared to the status vii. Here, a correlation calculation area 50, like the correlation calculation area 52, exists to the left. In other words, a correlation calculation area for correlation calculation is equal to the sum of the focus detection area 51, the correlation calculation areas 50 and the correlation calculation area 52 around the focus detection area 51, that is, an area 3 times that of the focus detection area 51.

FIG. 4B shows that an object is focused at i, that the phase difference detecting pixel column L 53 is shifted to the left at ii, that the phase difference detecting pixel column R 54 is shifted to the right at iii, that the phase difference detecting pixel column L 53 is shifted to the left at iv, and that the phase difference detecting pixel column R 54 is shifted to the right at v. Referring to FIG. 4B, the length of the correlation calculation area 52 is half the length of the focus detection area 51. The length of the correlation calculation area 50 at the opposite side is also half the length of the focus detection area 51.

Meanwhile, although not shown in FIGS. 4A and 4B, phase difference detecting pixel column L 53 and phase difference detecting pixel column R 54 may be shifted in opposite directions. In detail, the phase difference detecting pixel column L 53 may be shifted to the right at ii, the phase difference detecting pixel column R 54 may be shifted to the left at iii, the phase difference detecting pixel column L 53 may be shifted to the right at iv, and then the phase difference detecting pixel column R 54 may be shifted to the left at v. In this case, the correlation calculation area 50 and the correlation calculation area 52, which have half the length compared to that of the focus detection area 51, are used.

In other words, in the case of bidirectional shifting, the correlation calculation area 50 for correlation calculation is twice the focus detection area 51.

Although the above description is given based on a horizontal correlation calculation, a focus detection area and a correlation calculation area are also used for a vertical correlation calculation.

As described above with reference to FIGS. 4A and 4B, even if horizontal focus detection is performed throughout an imaging device, the imaging device may not be entirely set as a horizontal focus detection area due to a correlation calculation area.

Here, an area that may not be set as a horizontal focus detection area may be used as a vertical focus detection area by arranging vertical phase difference detecting pixels as described below with reference to FIG. 17.

Figure 5:
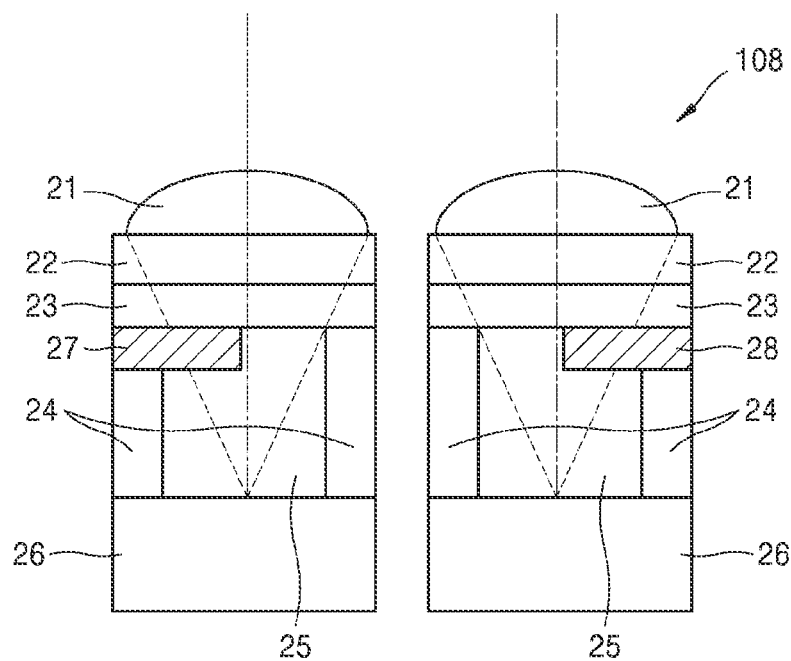
FIG. 5 shows a pixel configuration of an imaging device according to an embodiment of the present disclosure.

FIG. 5 shows a pixel configuration of the imaging device 108 according to an embodiment of the present disclosure.

Referring to FIG. 5, the imaging device 108 shows two pixels, where the left pixel denotes an R pixel and the right pixel denotes an L pixel. From above, a micro-lens 21, a surface layer 22, a color filter layer 23, a wiring layer 24, a photo diode layer 25, and a substrate layer 26 are arranged as shown in FIG. 5. The layers are simplified compared to actual ones. A light from an object is induced into the photo diode layer 25 of each of the pixels via the micro-lens 21, where charges are generated in photo diodes and become pixel information. The generated charges are output from the wiring layer 24. A light from an object is incident via an exit pupil of an image pickup lens, where brightness information regarding location of the object may be obtained based on pixel locations. The color filter layer 23 uses three colors, which are red (R), green (G), and blue (B), at each pixel. Furthermore, a mask may be arranged at an aperture, thereby configuring the pixels as phase difference detecting pixels capable of receiving R and L signals, like the light receiving pixel R 15 and the light receiving pixel L 16 of FIG. 2.

An R pixel mask 27 and an L pixel mask 28 may be arranged between the micro-lens 21 and the photo diode layer 25.

Referring to FIG. 5, the imaging device 108 includes the R pixel mask 27 and the L pixel mask 28 between the micro-lens 21 and the photo diode layer 25. Locations of the R pixel mask 27 and the L pixel mask 28 are not limited to those shown in FIG. 5, as long as the R pixel mask 27 and the L pixel mask 28 are between the micro-lens 21 and photo diodes. Referring to FIG. 5, an optical axis of the micro-lens 21 is indicated with a dot-dash line, whereas a path of light incident from the micro-lens 21 is indicated with a broken line, which may also be referred to as a dashed line. The optical axis of the path of light from an image pickup lens is restricted to about 50% by the R pixel mask 27 and the L pixel mask 28.

FIG. 5 shows that an R pixel and an L pixel are separate from each other. However, various embodiments of the present disclosure are not limited thereto. An R pixel and an L pixel may be arranged adjacent to each other or may be a distance apart from each other.

Figure 6:
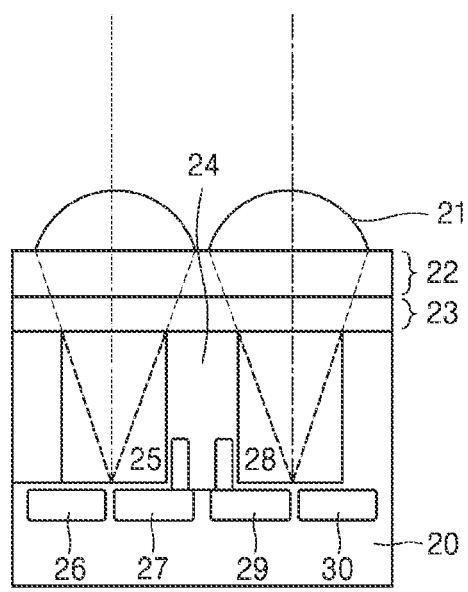
FIG. 6 is a diagram showing an example in which a plurality of phase difference detecting pixels are arranged in a single micro-lens according to an embodiment of the present disclosure.

FIG. 6 is a diagram showing an example in which a plurality of phase difference detecting pixels are arranged in a single micro-lens according to an embodiment of the present disclosure.

Referring to FIG. 6, the micro-lens 21, the surface layer 22, the color filter layer 23, the wiring layer 24, photoelectric converting layers, and a substrate layer 20 may be arranged from above in the order stated. The photoelectric converting layers include four photoelectric converting layers, which may include the photo diode layer 25, the substrate layer 26, the R pixel mask 27, the L pixel mask 28, a photoelectric converting layer 29, and a photoelectric converting layer 30. As shown in FIG. 6, a photoelectric converting layer may be divided into two at each pixel. A photoelectric converting layer may be formed of a photo diode or a photo transistor.

When photoelectric converting layers are used as phase difference detecting pixels, to operate R column pixels, the right set of photoelectric converting layers 25 and 27 of a first half of photoelectric converting layers should be turned ON and the left set of photoelectric converting layers 25 and 26 of the first half of the photoelectric converting layers should be turned OFF. On the contrary, to operate L column pixels, the left set of photoelectric converting layers 28 and 29 of a second half of photoelectric converting layers should be turned ON and the right set of photoelectric converting layers 28 and 30 of the second half of the photoelectric converting layers should be turned OFF. Locations of the L column pixel and the R column pixel may be reversed. If all of the R column pixel and the L column pixel are turned ON, the pixels may also be used as imaging pixels.

Here, pixels may be turned ON and OFF by photoelectric converting units or, as described below, pixels may be turned ON and OFF by read-out lines of photoelectric converting units.

Figure 7A:
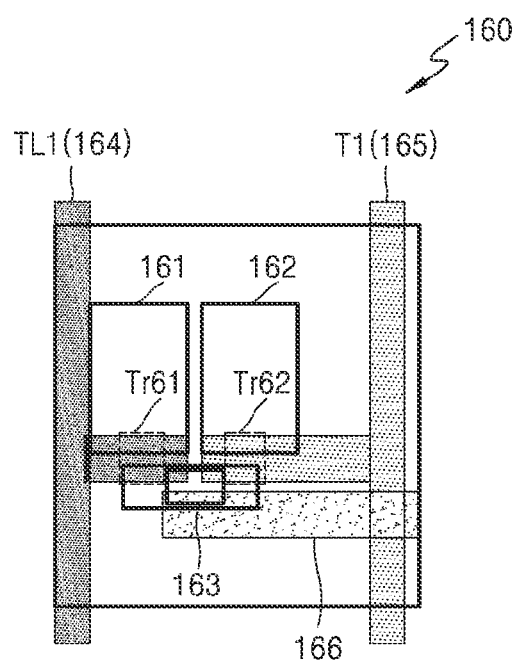
FIGS. 7A and 7B are plan views showing a circuit configuration of an imaging device according to an embodiment of the present disclosure.
Figure 7B:
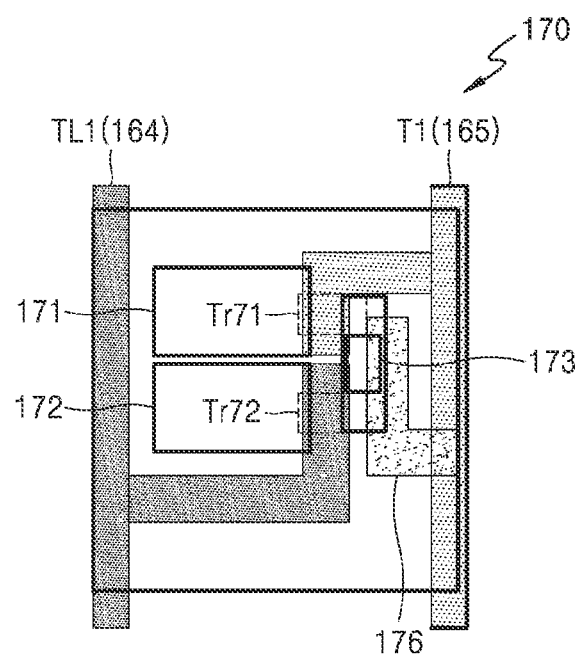

FIGS. 7A and 7B are plan views showing a circuit configuration of an imaging device, according to an embodiment of the present disclosure.

Referring to FIG. 7A, (a) indicates a horizontal phase difference detecting pixel 160, which may also be referred to as a pixel 160, whereas (b) indicates a vertical phase difference detecting pixel 170, which may also be referred to as a pixel 170.

As shown in FIG. 7A, the pixel 160 includes photo diodes 161 and 162 around the optical axis (not shown) of a micro-lens. A common read-out unit 163 is arranged at the pixel 160.

As shown in FIG. 7A, the pixel 160 includes a transmission transistor Tr61 consisting of the photo diode 161, the read-out unit 163, and a transmission signal line TL1 164. Furthermore, the pixel 160 includes a transmission transistor Tr62 consisting of the photo diode 162 and a transmission signal line TL1 165.

A wiring 166 is arranged from the read-out unit 163 to an amplification transistor (not shown) of an output unit.

Likewise, referring to FIG. 7B, the pixel 170 includes photo diodes 171 and 172 around the optical axis (not shown) of a micro-lens. A common read-out unit 173 is arranged at the pixel 170.

Referring to FIG. 7B, the pixel 170 includes a transmission transistor Tr71 consisting of the photo diode 171, the read-out unit 173, and a transmission signal line TL1 164. Furthermore, the pixel 170 includes a transmission transistor Tr72 consisting of the photo diode 172 and a transmission signal line TL1 165.

A wiring 176 is arranged from the read-out unit 173 to an amplification transistor (not shown) of an output unit.

The horizontal phase difference detecting pixel 160 shown in FIG. 7A and the vertical phase difference detecting pixel 170 shown in FIG. 7B may use the same transmission signal line TL1 164 and the transmission signal line TL1 165.

According to an embodiment of the present disclosure, if the pixel 160 of FIG. 7A or the pixel 170 of FIG. 7B is used as an R column phase difference detecting pixel, the transmission signal line TL1 164 is turned OFF. Here, charge outputs from the photo diode 161 and the photo diode 172 may be blocked. If the pixel 160 of FIG. 7A or the pixel 170 of FIG. 7B is used as an L-column phase difference detecting pixel, the transmission signal line TL1 165 is turned OFF. Here, charge outputs from the photo diode 162 and the 171 may be blocked.

According to an embodiment of the present disclosure, although FIG. 7A shows that the read-out unit 163 is arranged below the photo diode 161 and the photo diode 162, the read-out unit 163 may be arranged above the photo diode 161 and the photo diode 162. Furthermore, the photo diode 161 and the photo diode 162 to be used as L and R column phase difference detecting pixels may be reversed. Likewise, although FIG. 7B shows that the common read-out unit 173 is arranged to the right of the photo diodes 171 and 172, the read-out unit 173 may also be arranged to the left of the photo diodes 171 and 172. Furthermore, the photo diode 171 and the photo diode 172 to be used as L and R column phase difference detecting pixels may be reversed.

According to an embodiment, if the pixel 160 of FIG. 7A or the pixel 170 of FIG. 7B is used as an imaging pixel, the transmission signal line TL1 164 and the transmission signal line TL1 165 may be turned ON, thereby enabling the photo diodes 161 and 162 or the photo diodes 171 and 172 to output charges. However, the present disclosure is not limited thereto.

Referring to FIGS. 7A and 7B, a photo diode for outputting charges may be arbitrarily selected, and thus freedom of configuring phase difference detecting pixels may be improved.

FIG. 8 is a diagram showing an example arrangement of phase difference detecting pixels in an imaging device capable of detecting horizontal and vertical phase differences according to an embodiment of the present disclosure.

Referring to FIG. 8, an imaging device 60 may be a part for an imaging device in which phase difference detecting pixels as described above with reference to FIG. 5 are arranged. A circle 801 indicates a micro-lens, whereas a rectangle 802 indicates an aperture of a photo diode. The imaging device 60 may include a normal pixel 61. The imaging device 60 may include a horizontal L column pixel 62, a horizontal R column pixel 63, a vertical L column pixel 64, and a vertical R column pixel 65. The imaging device 60 may detect horizontal phase difference by using the horizontal L column pixel 62 and the horizontal R column pixel 63 and may detect vertical phase difference by using the vertical L column pixel 64 and the vertical R column pixel 65. Phase difference detecting pixels as described above may be arranged throughout the imaging device 60.

Here, horizontal phase difference detecting pixels may be arranged at intervals of every 8 pixels in a horizontal direction, where the horizontal L column pixel 62 and the horizontal R column pixel 63 may be arranged at intervals of every 12 pixels in a vertical direction. A correlation calculation is performed with respect to the L column and the R column at the intervals of 12 pixels. For example, in the imaging device 60, a horizontal correlation calculation may be performed with respect to an L column including the horizontal L column pixel 62 and an R column including the horizontal R column pixel 63. However, based on a frequency condition and/or an amount of defocus regarding an object, a virtual horizontal R column pixel may be generated from a horizontal L column pixel and two normal pixels adjacent thereto. Furthermore, a virtual horizontal L column pixel may be generated from a horizontal R column pixel and two normal pixels adjacent thereto. Horizontal L and R columns may be configured by using the virtual R and L column pixels for the correlation calculation. In this case, there is no problem with respect to sampling even if there is an interval of 12 pixels.

Likewise, vertical phase difference detecting pixels may be arranged at an interval of every 12 pixels in a vertical direction, where the vertical L column pixel 64 and the vertical R column pixel 65 may be arranged at intervals of every 8 pixels in a horizontal direction. A correlation calculation is performed with respect to the L column and the R column at the intervals of 8 pixels. For example, in the imaging device 60, a vertical correlation calculation may be performed with respect to an L column including the vertical L column pixel 64 and an R column including the vertical R column pixel 65. Like the horizontal correlation calculation, the vertical correlation calculation may be performed by using virtual pixels.

In the case of using the imaging device 60 as shown in FIG. 8, phase differences may be detected in horizontal and vertical directions throughout the imaging device 60.

Figure 9:
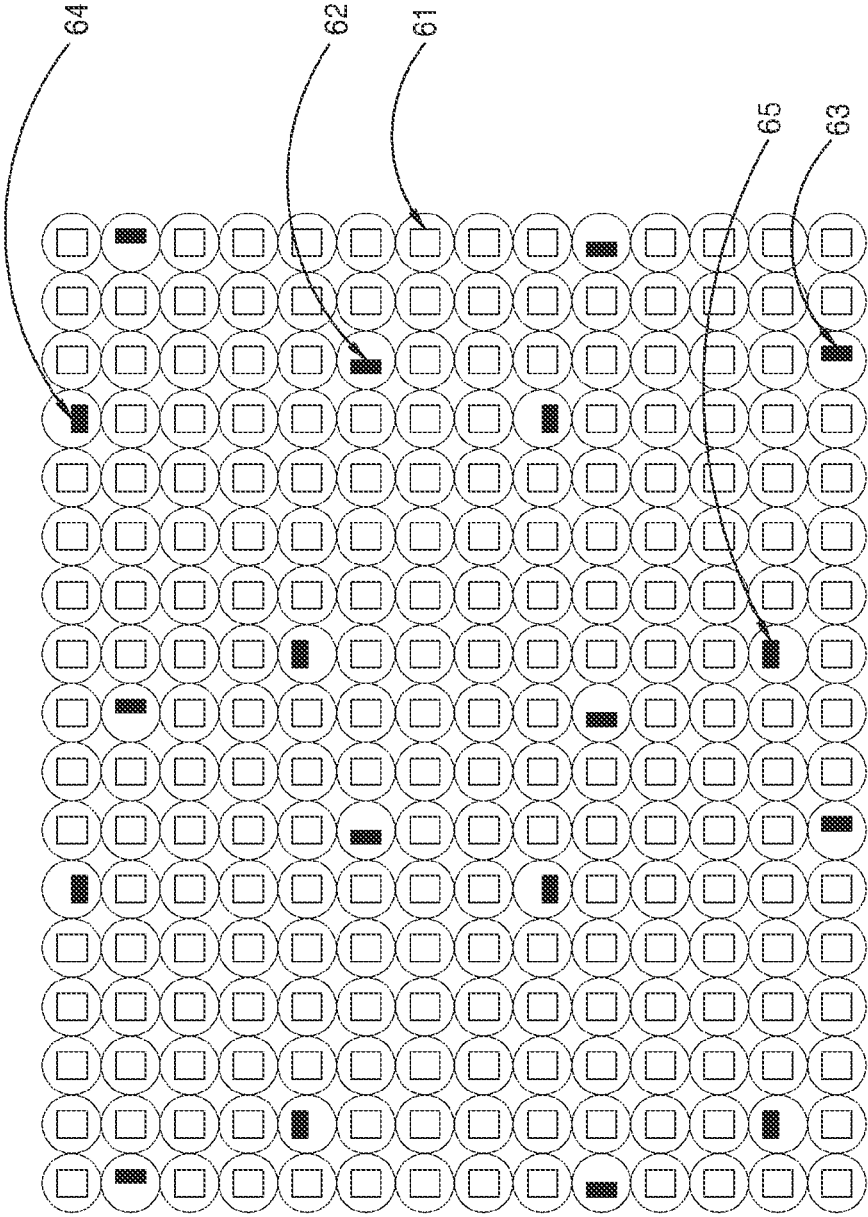
FIG. 9 shows an example arrangement of phase difference detecting pixels in an imaging device capable of detecting horizontal and vertical phase differences according to an embodiment of the present disclosure.

FIG. 9 shows an example arrangement of phase difference detecting pixels in an imaging device capable of detecting horizontal and vertical phase differences according to an embodiment of the present disclosure.

Referring to FIG. 9, a phase difference detecting pixel arrangement of an imaging device 66 during a live view output is shown.

Here, it is assumed that an imaging device in a Bayer arrangement is read by using a 1 read and 2 skip method. Here, the 1 read and 2 skip method refers to a method of using a value detected via one pixel, from among three successively arranged pixels, and not using values detected via the remaining two successive pixels thereafter. The Bayer arrangement may be maintained even if the 1 read and 2 skip method is used. A ratio of phase difference detecting pixels increases as compared to FIG. 8.

The imaging device 66 of FIG. 9 may include the horizontal L column pixel 62, the horizontal R column pixel 63, the vertical L column pixel 64, and the vertical R column pixel 65.

Horizontal phase difference detecting pixels are arranged at intervals of 8 pixels, whereas the horizontal L column pixel 62 and the horizontal R column pixel 63 are arranged at intervals of 4 pixels. Vertical phase difference detecting pixels are arranged at intervals of 8 pixels, whereas the vertical L column pixel 64 and the vertical R column pixel 65 are arranged at intervals of 4 pixels. Like the imaging device 60 shown in FIG. 8, phase differences may be detected in horizontal and vertical directions throughout the imaging device 66. Phase difference detecting pixels may be arranged throughout the imaging device 66.

Figure 10:
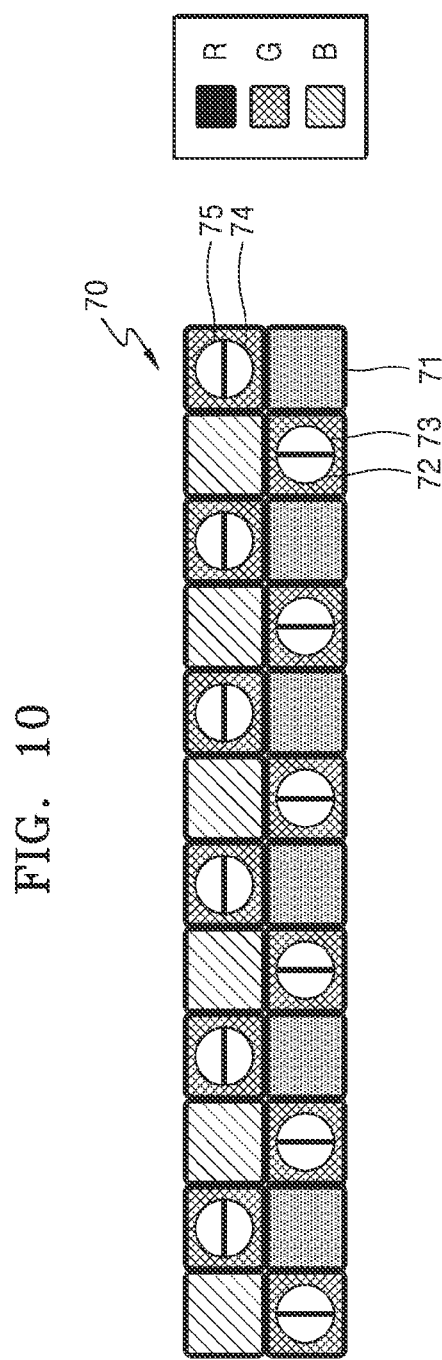
FIG. 10 shows an example arrangement of phase difference detecting pixels in an imaging device capable of detecting horizontal and vertical phase differences according to an embodiment of the present disclosure.

FIG. 10 shows an example arrangement of phase difference detecting pixels in an imaging device capable of detecting horizontal and vertical phase differences according to an embodiment of the present disclosure.

Referring to FIG. 10, phase difference detecting pixels arranged in G pixels in the Bayer arrangement are illustrated. The phase difference detecting pixels indicated as a plurality of rectangles in an imaging device 70 may be the phase difference detecting pixels as described above with reference to FIG. 6. The imaging device 70 includes normal pixels 71, horizontal phase difference detecting pixels, and vertical phase difference detecting pixels.

As shown in FIG. 10, vertical phase difference detecting pixels arranged at an upper portion of the imaging device 70 include two photo diodes 74 and 75, whereas horizontal phase difference detecting pixels arranged at a lower portion of the imaging device 70 include two photo diodes 72 and 73. At each of the phase difference detecting pixels, a circular aperture is shown.

The horizontal phase difference detecting pixels arranged at the lower portion of the imaging device 70 may include the photo diodes 72 and 73. Each of the horizontal phase difference detecting pixels of the imaging device 70 may be similar to the phase difference detecting pixel shown in FIG. 7A. When charge output from the photo diode 72 is used and charge output from the photo diode 73 is blocked, the horizontal phase difference detecting pixels may be used as horizontal L column pixels. When charge output from the photo diode 73 is used and charge output from the photo diode 72 is blocked, the horizontal phase difference detecting pixels may be used as horizontal R column pixels.

The vertical phase difference detecting pixels arranged at the lower portion of the imaging device 70 may include the photo diodes 74 and 75. The vertical phase difference detecting pixels of the imaging device 70 may become the phase difference detecting pixel shown in FIG. 7B. When charge output from the photo diode 74 is used and charge output from the photo diode 75 is blocked, the vertical phase difference detecting pixels may be used as vertical L column pixels. When charge output from the photo diode 75 is used and charge output from the photo diode 74 is blocked, the vertical phase difference detecting pixels may be used as vertical R column pixels.

Figure 11:
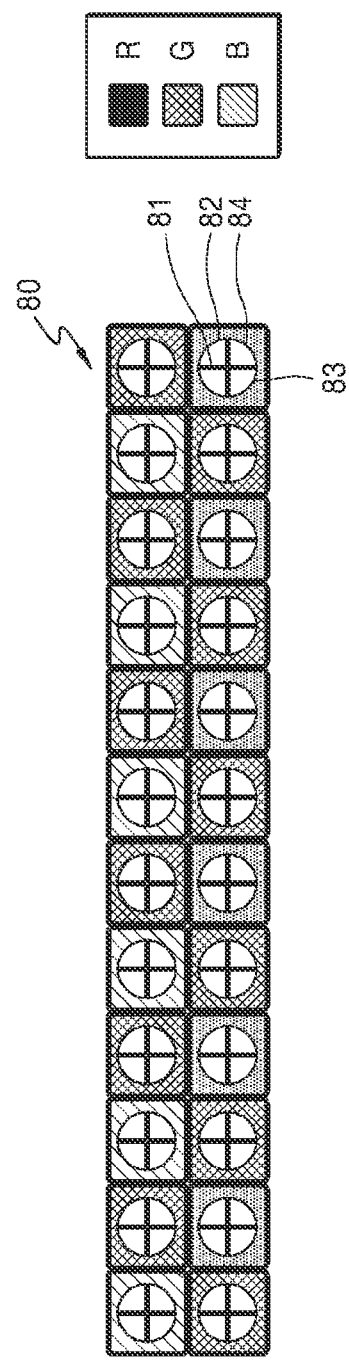
FIG. 11 shows an example arrangement of phase difference detecting pixels in an imaging device capable of detecting horizontal and vertical phase differences according to an embodiment of the present disclosure.

FIG. 11 shows an example arrangement of phase difference detecting pixels in an imaging device capable of detecting horizontal and vertical phase differences according to an embodiment of the present disclosure.

Referring to FIG. 11, quad-split photo diodes 81, 82, 83, and 84 are arranged at each of phase difference detecting pixels in the Bayer arrangement in an imaging device 80. A horizontal L column pixel may consist of the photo diode 81 and the photo diode 83, whereas a horizontal R column pixel may consist of the photo diode 82 and the photo diode 84. For example, if charge outputs of the photo diode 82 and the photo diode 84 are blocked and charge outputs of the photo diode 81 and the photo diode 83 are used, phase difference detecting pixels may be used as horizontal L column pixels. If charge outputs of the photo diode 82 and the photo diode 84 are used and charge outputs of the photo diode 81 and the photo diode 83 are blocked, phase difference detecting pixels may be used as horizontal R column pixels.

Likewise, a vertical L column pixel may consist of the photo diode 83 and the photo diode 84, whereas a vertical R column pixel may consist of the photo diode 81 and the photo diode 82.

Based on locations of phase difference detecting pixels, the phase difference detecting pixels may be selectively used as horizontal phase difference detecting pixels or vertical phase difference detecting pixels. A horizontal and vertical mixed area may be arbitrarily set. If quad-split photo diodes are allowed to independently output charge, phase difference detecting pixels may be simultaneously used as horizontal and/or vertical phase difference detecting pixels.

Figure 12:
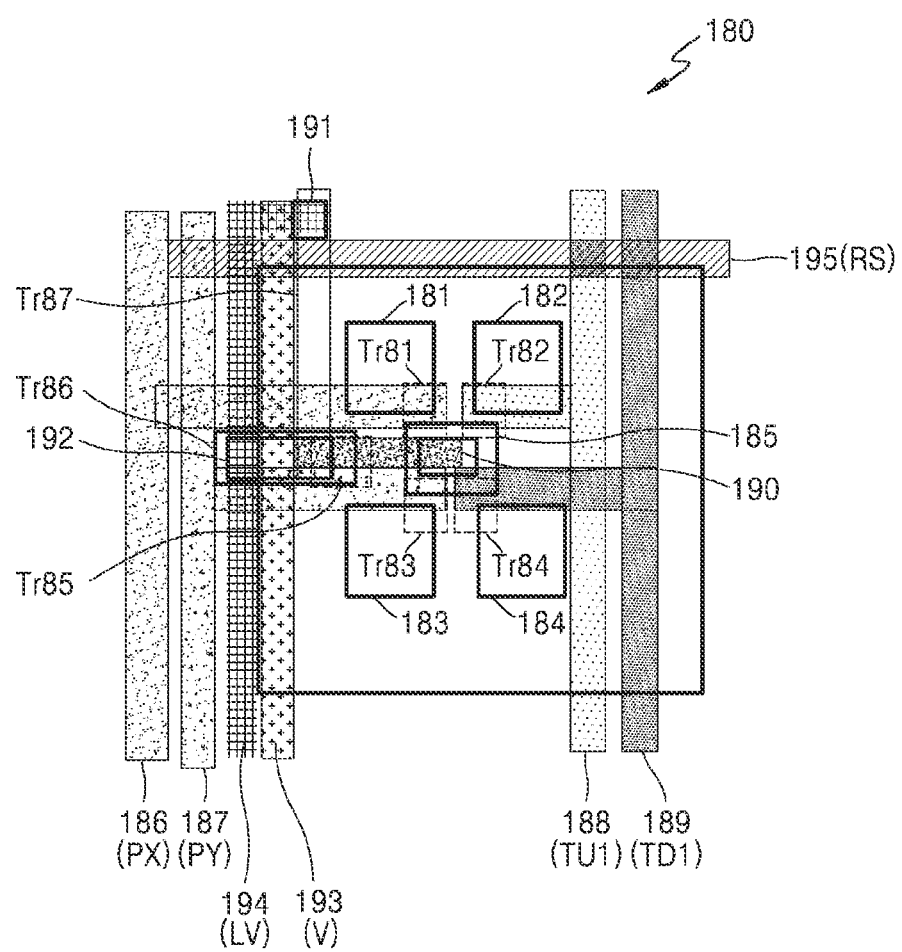
FIG. 12 is a plan view showing a circuit configuration of a phase difference detecting pixel including quad-split photo diodes, such as shown in FIG. 11, according to an embodiment of the present disclosure.

FIG. 12 is a plan view showing the circuit configuration of a phase difference detecting pixel including quad-split photo diodes, such as shown in FIG. 11, according to an embodiment of the present disclosure.

Referring to FIG. 12, in a pixel 180, photo diodes 181, 182, 183, and 184 are arranged around the optical axis of a micro-lens (not shown). A common read-out unit 185 is arranged at a center of the photo diodes 181, 182, 183, and 184. The pixel 180 includes a transmission transistor Tr81 consisting of the photo diode 181, the read-out unit 185, and a transmission signal line PX 186. Furthermore, the pixel 180 includes a transmission transistor Tr82 consisting of the photo diode 182, the read-out unit 185, and a transmission signal line TU1 188, a transmission transistor Tr83 consisting of the photo diode 183, the read-out unit 185, and a transmission signal line PY 187, a transmission transistor Tr84 consisting of the photo diode 184, the read-out unit 185, and a transmission signal line PY 187. A charge output line 190 is arranged from the read-out unit 185 to an amplification transistor Tr85.

Phase difference detecting pixel outputs may be controlled by selecting the photo diode 181 via the transmission signal line PX 186, selecting the photo diode 182 via the transmission signal line TU1 188, selecting the photo diode 183 via the transmission signal line PY 187, and selecting the photo diode 184 via a transmission signal line TD1 189.

The charge output line 190 is connected to the amplification transistor Tr85. An image signal read-out line LV 194 is arranged between the amplification transistor Tr85 and a pixel read-out selection transistor Tr86. An amplified signal is output from a terminal 192 of the pixel read-out selection transistor Tr86 to the image signal read-out line LV 194. Furthermore, a reset transistor Tr87 is arranged across a terminal 191 of the image signal read-out line LV 194 and a reset line RS 195. The photo diodes 181, 182, 183, and 184 are simultaneously charge-reset according to a reset signal from the common read-out unit 185.

By controlling four transmission signal lines, it may be determined whether to set a phase difference detecting pixel as a horizontal phase difference detecting pixel, a vertical phase difference detecting pixel, or a normal pixel. In detail, an output of the photo diode 181 may be controlled by a control signal from the transmission signal line PX 186, whereas an output of the photo diode 183 may be controlled by a control signal from the transmission signal line PY 187. When the transmission signal line PX 186 and the transmission signal line PY 187 are simultaneously turned ON, the phase difference detecting pixel functions as a horizontal L column phase difference detecting pixel. When the transmission signal line PX 186 and the transmission signal line PY 187 are turned OFF and the transmission signal line TU1 188 and the transmission signal line TD1 189 are turned ON, the phase difference detecting pixel functions as a horizontal R column phase difference detecting pixel. Furthermore, if the transmission signal line PX 186 and the transmission signal line TU1 188 are turned OFF and the transmission signal line PY 187 and the transmission signal line TD1 189 are turned ON, the phase difference detecting pixel functions as a vertical L column phase difference detecting pixel. If the transmission signal line PX 186 and the transmission signal line TU1 188 are turned ON and the transmission signal line PY 187 and the transmission signal line TD1 189 are turned OFF, the phase difference detecting pixel functions as a vertical R column phase difference detecting pixel. When all of the transmission signal line PX 186, transmission signal line TU1 188, transmission signal line PY 187, and transmission signal line TD1 189 are turned ON, the phase difference detecting pixel functions as a normal pixel. Meanwhile, transmission signal lines may be controlled by a driving circuit or a timing control circuit of a read-out circuit that controls an imaging device.

Figure 13:
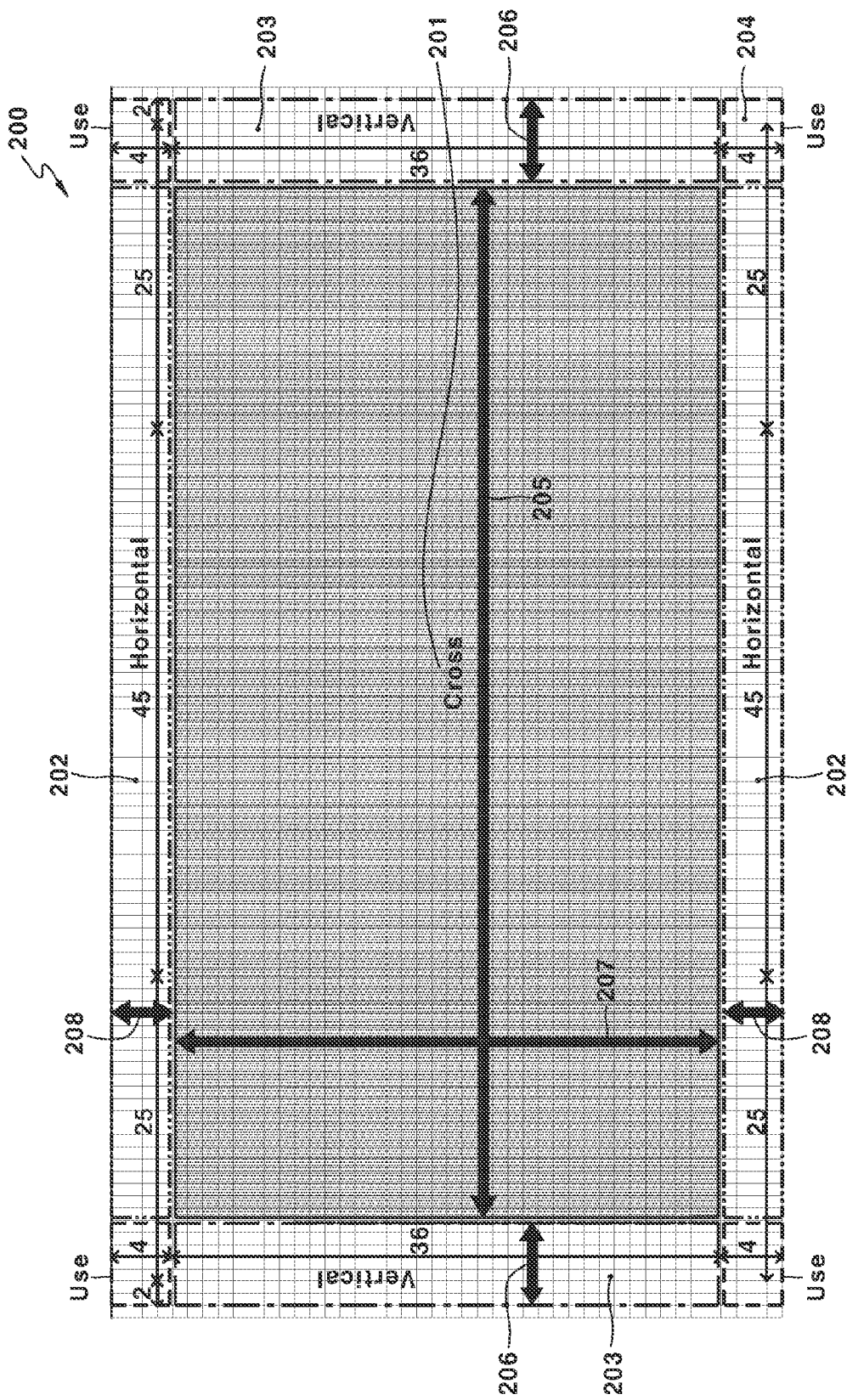
FIG. 13 is a diagram showing an entire imaging device in which phase difference detecting pixels are arranged according to an embodiment of the present disclosure.

FIG. 13 is a diagram showing the entire imaging device in which phase difference detecting pixels are arranged according to an embodiment of the present disclosure.

Referring to FIG. 13, phase difference detecting pixels capable of horizontal and vertical detections are shown as being arranged throughout an imaging device 200. The imaging device 200 includes a cross phase difference focus area 201 capable of detecting horizontal and vertical phase differences, a horizontal phase difference focus area 202 capable of detecting only a horizontal phase difference, a vertical phase difference focus area 203 capable of detecting only a vertical phase difference, and an area 204, which detects a phase difference but may not be set as a focus area.

As described above with reference to FIGS. 4 and 5, a focus area may not be set throughout an imaging device. In a horizontal phase difference focus area 205 of FIG. 13, a horizontal phase difference may be detected. However, a camera is expected to set a focus area as large as possible. Therefore, an area 206, which may not be set as a horizontal phase difference focus area, is set as a vertical-only focus area for detecting a vertical phase difference. The area 206 corresponds to the vertical phase difference focus area 203. FIG. 13 shows that the vertical phase difference focus area 203 is horizontally arranged around the cross phase difference focus area 201.

Likewise, in a vertical phase difference focus area 207 of FIG. 13, a vertical phase difference may be detected. Therefore, an area 208, which may not be set as a vertical phase difference focus area, is set as a vertical-only focus area for detecting a vertical phase difference. The area 208 corresponds to the vertical phase difference focus area 202. FIG. 13 shows that the vertical phase difference focus areas 202 are vertically arranged around the cross phase difference focus area 201.

Figure 14:
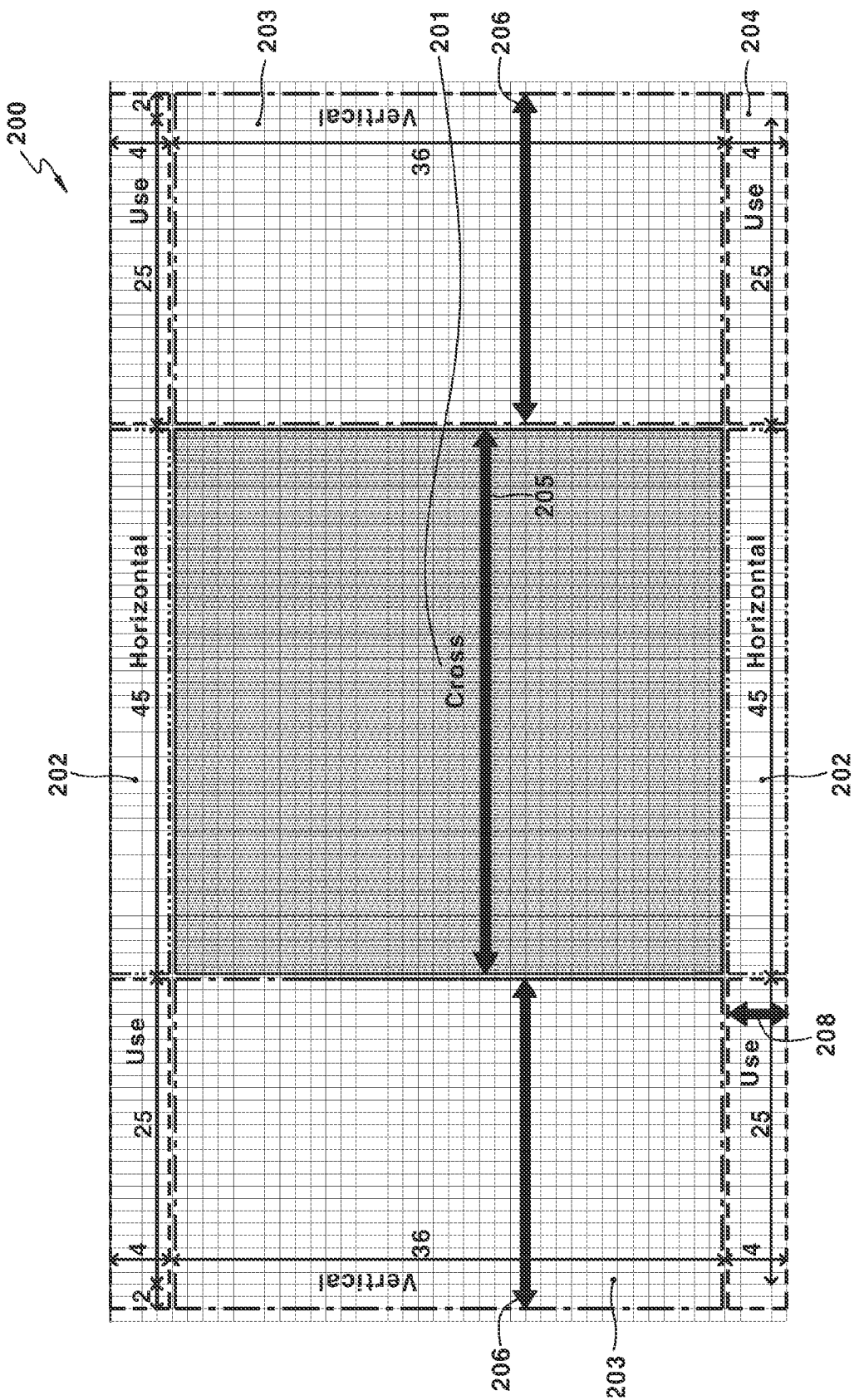
FIG. 14 is a diagram showing another example of an entire imaging device in which phase difference detecting pixels are arranged according to an embodiment of the present disclosure.

FIG. 14 is a diagram showing another example of an entire imaging device in which phase difference detecting pixels are arranged according to an embodiment of the present disclosure.

Referring to FIG. 14, descriptions below will focus on different arrangement of a focus area for horizontal and vertical detection from that of FIG. 13. As shown in FIG. 13, a focus area may be set based on only phase difference correlation calculation. However, based on conditions of an image pickup lens, a light amount balance between the L column and R column may be significantly damaged in terms of phase difference detection. Particularly, if a location of the pupil of the image pickup lens is too close to, or too far from, an imaging device, it becomes difficult to correct the light amount balance, such as an area from which phase difference may not be detected even when light balance correction, shading correction, vignetting correction, etc., are performed.

A condition and/or a state of the image pickup lens is determined based on a distance from the center of the optical axis of the image pickup lens. Detection of a phase difference in a direction perpendicular to the center of the optical axis does less damage the light amount balance. Vertical phase difference detection is arranged at a location horizontally apart from the center of the optical axis, whereas horizontal phase difference detection is arranged at a location vertically apart from the center of the optical axis. In other words, the horizontal phase difference may be detected within the horizontal phase difference focus area 205, which may also be referred to as a range 205. A horizontal range exceeding the range 205 is used as the area 206, which may also be referred to as a horizontal phase difference detecting range 206. The same applies to the vertical direction. An area capable of detecting phase differences in horizontal and vertical directions becomes a cross area, wherein lengths in horizontal directions are identical to lengths in vertical directions. The area becomes the cross phase difference focus area 201. In the same regard, FIG. 14 shows that the vertical phase difference focus area 203 is horizontally arranged around the cross phase difference focus area 201, and the horizontal phase difference focus areas 202 are vertically arranged around the cross phase difference focus area 201.

Figure 15:
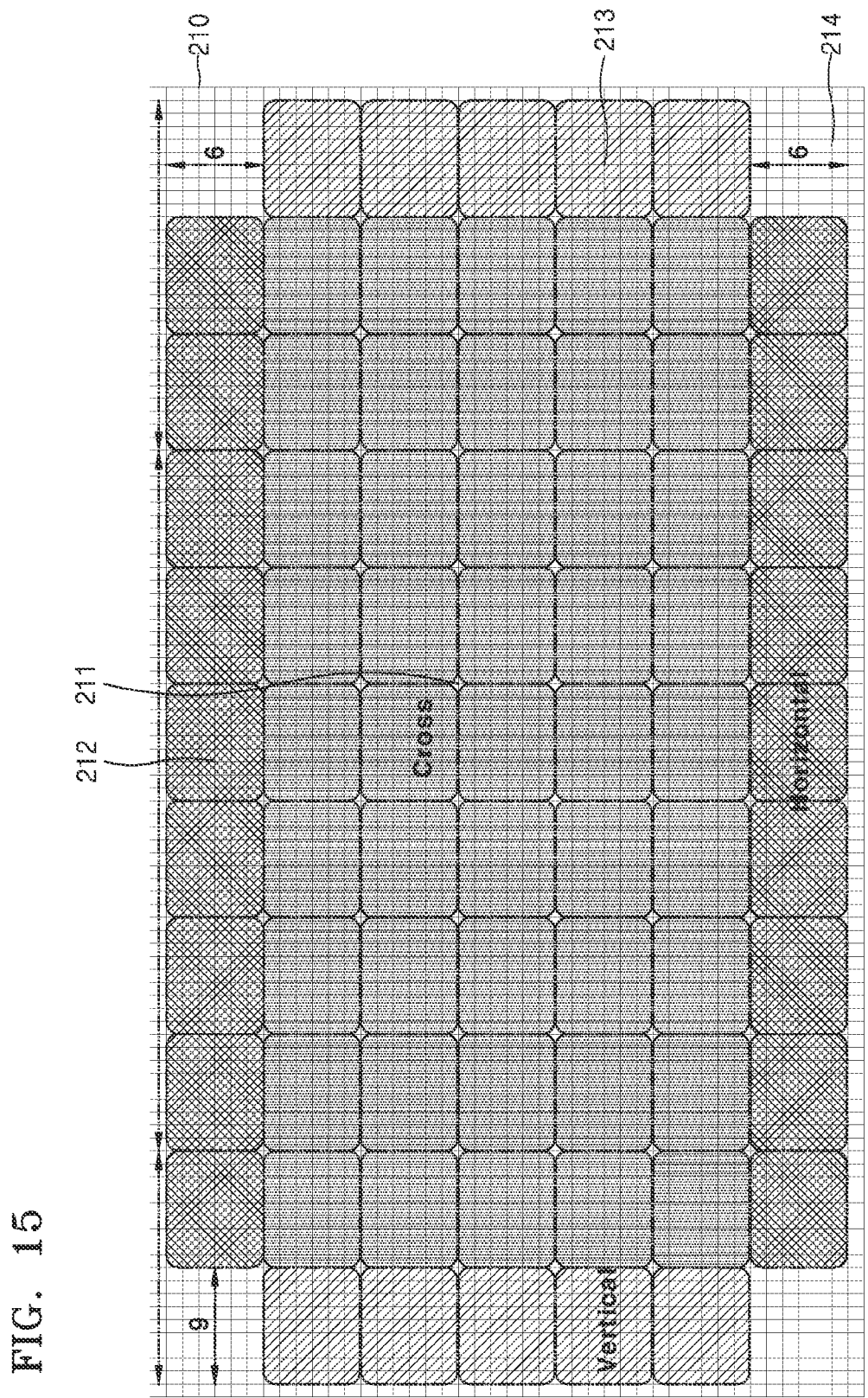
FIG. 15 is a diagram showing an entire multi-focus area that satisfies conditions for vertical and horizontal phase differences, such as shown in FIG. 13, according to an embodiment of the present disclosure.

FIG. 15 is a diagram showing an entire multi-focus area that satisfies conditions for vertical and horizontal phase differences, such as shown in FIG. 13, according to an embodiment of the present disclosure.

Referring to FIG. 15, a cross phase difference focus area 211 that consists of 45 blocks, a horizontal phase difference focus area 212 that consists of 18 blocks, and a vertical phase difference focus area 213 that consists of 10 blocks are included in an entire multi-focus area 210. The multi-focus area 210 also includes an area 214, which detects phase difference but may not be set as a focus area.

Figure 16:
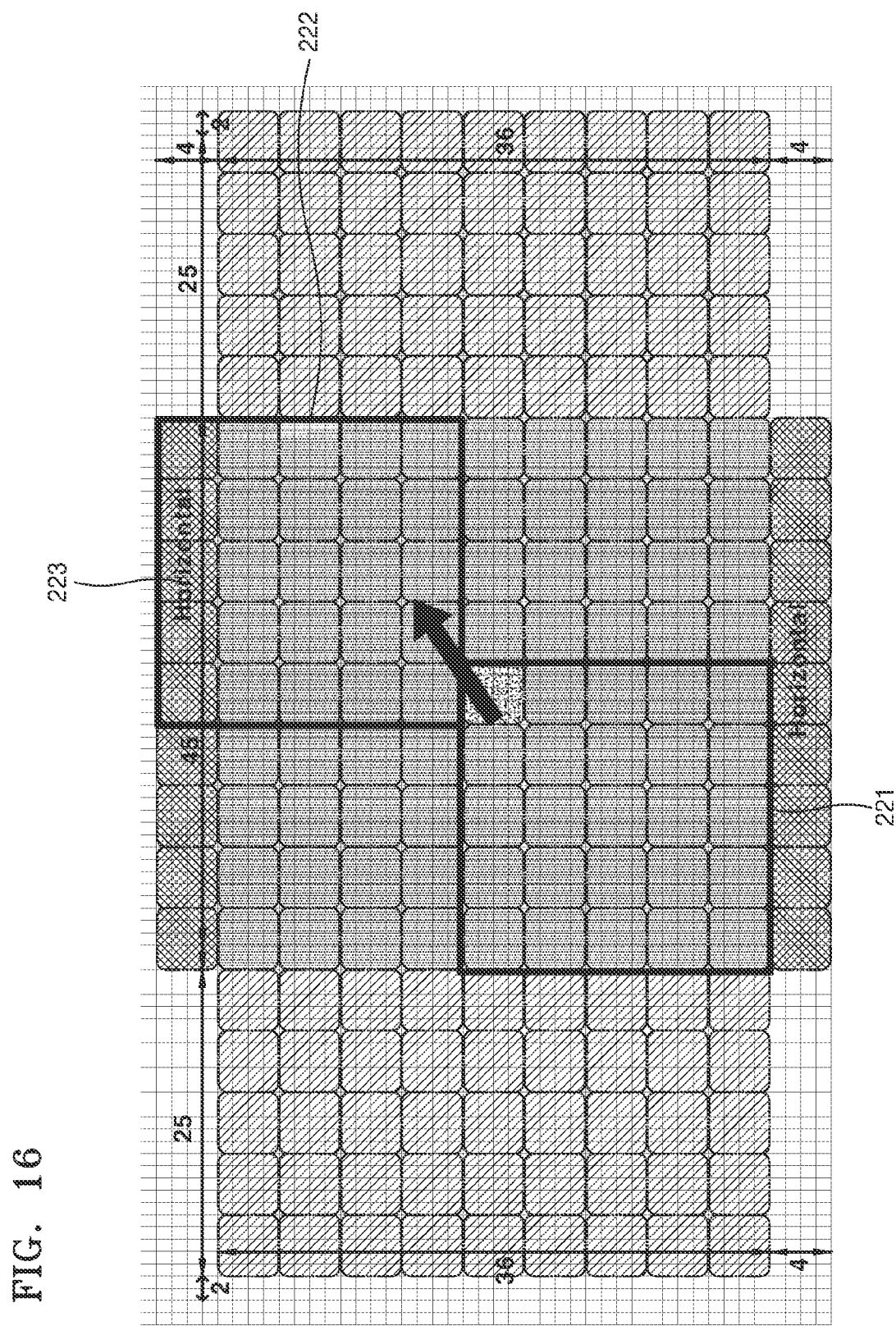
FIG. 16 is a diagram showing that the entire multi-focus area is divided according to an embodiment of the present disclosure.

FIG. 16 is a diagram showing that an entire multi-focus area is divided according to an embodiment of the present disclosure.

Referring to FIG. 16, a size of an arbitrary area may be set, and a small multi-focus area, which is a division of the entire multi-focus area, may be moved. A small multi-focus area 221, having a size of 5×5 blocks, may be moved to a small multi-focus area 222. Cross phase difference detection may be performed in an entirety of the small multi-focus area 221 prior to the movement. However, as shown in FIG. 16, when the small multi-focus area 221 is moved to the small multi-focus area 222, an upper edge area 223 of the small multi-focus area 222 is set as a horizontal phase difference focus area. The reason for this is as described above with reference to FIG. 13.

Figure 17:
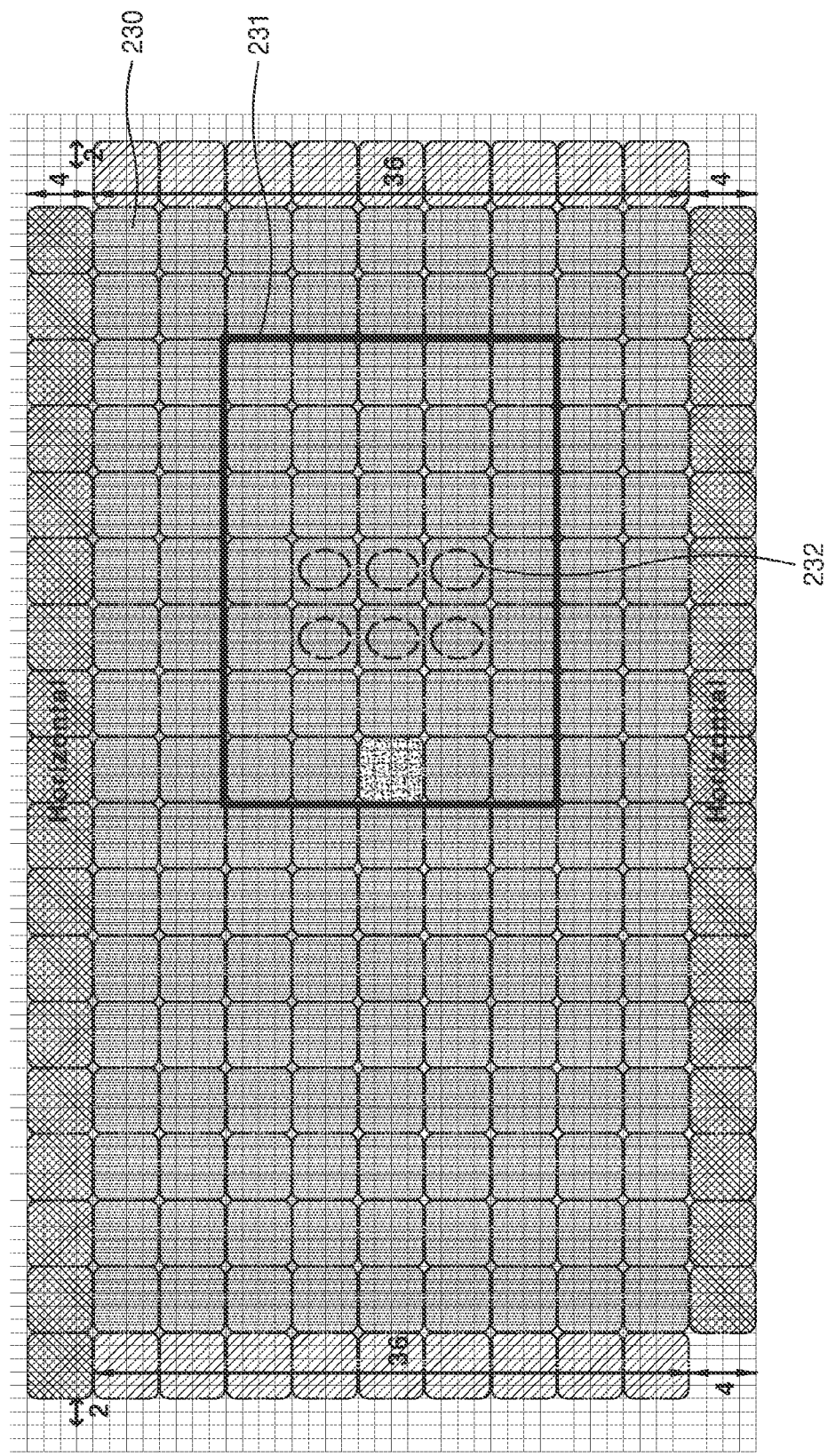
FIG. 17 is a diagram showing a small multi-focus area, which is a division of the entire multi-focus area according to an embodiment of the present disclosure.

FIG. 17 is a diagram showing a small multi-focus area, which is a division of an entire multi-focus area according to an embodiment of the present disclosure.

Referring to FIG. 17, in an entirety of a multi-focus area 230 consisting of 19×11 small blocks, a 7×5 multi-focus area 231 is set. An area at which focus is set is marked with a focus mark 232.

When a main object is initially selected by a camera, the main object is selected from 77 areas by using the entire multi-focus area consisting of 11=7 normal-sized blocks as shown in FIG. 15. Once the main object is selected, the entire multi-focus area is switched to the entire multi-focus area 230 consisting of 19×11 small-sized blocks as shown in FIG. 17.

Here, the size of a block, obtained by dividing the initially set entire multi-focus area, is divided into 11×7 blocks as shown in FIG. 15 and is referred to as the normal size, whereas the size of a smaller block obtained after a main object is selected is referred to as the small size.

The 7×5 small multi-focus area 231 is newly set around the location of the main object selected by using normal-sized blocks.

By setting the 7×5 small multi-focus area 231 in an area consisting of normal-sized blocks, focus calculations are first performed 77 times, which corresponds to the number of normal-sized blocks of the entire multi-focus area, and is then performed 35 times, which corresponds to the number of small-sized blocks in a small multi-focus area, after a main object is detected. Since it is not necessary to perform focus calculations 209 times, which corresponds to the number of small-sized blocks of the entire multi-focus area, a calculation load of a signal processing circuit may be reduced and AF time may be reduced.

After the small multi-focus area 231 is set, it is not necessary to determine a main object, and a main object tracking algorithm may be executed.

Here, the main object tracking algorithm is an algorithm for determining a main object by using zoom information and/or prioritizing a center of a screen image and/or recent objects. According to an embodiment, a main object may be a person located closest to the center of a screen image and/or an object located at the center of a screen image. The main object tracking algorithm is an algorithm is for selecting an object closest to a focused location and a difference of a previous main object.

Four corner areas of an imaging device are not set as focus detection areas, as described above with reference to FIG. 13.

FIG. 18 is a flowchart showing an AF process using a small multi-focus area, such as the small multi0focus area of FIG. 17, according to an embodiment of the present disclosure.

Referring to FIG. 18, when a main switch is turned ON, a camera initiates a booting sequence, and a live view is activated. In operation S101, the camera displays a live view image and receives and/or inputs image information from an imaging device at the same time.

In operation S102, the camera performs a focus calculation with respect to each block of the entire multi-focus area consisting of 11×7 normal-sized blocks, or in other words, performs an 11×7 normal multi-area calculation.

In operation S103, the camera determines a location of a main object by executing a normal main object tracking algorithm for normal-sized blocks.

In operation S104, the camera stores a location of the main object. For example, the location of the main object may be stored as coordinates corresponding to image, and/or any other similar and/or suitable type of information indicating a location of the main object.

In operation S105, the camera determines whether an S1 signal, which indicates that a shutter button, or any other similar and/or suitable user input, is half-pressed, is turned ON. If the S1 signal is not turned ON, the method proceeds to operation S101. If the S1 signal is turned ON, then the method proceeds to operation S106 and the entire multi-focus area is switched to a small multi-focus area.

In operation S107, the camera sets a location of the small multi-focus area based on the location of the main object stored in operation S104.

In operation S108, the camera executes a small main object tracking algorithm for small-sized blocks. When the location of the main object is updated with respect to the small multi-focus area consisting of small-sized blocks, the camera operates a lens to focus the location of the main object with respect to the updated location of the main object in an operation S109.

In an operation S110, the camera determines if the lens operation is finished and/or completed.

When the lens operation is finished, the camera performs a focus calculation for focus confirmation and confirms a focused area, or in other words, determines the focus and determines the focused area, in operation S111.

In operation S112, the camera marks the focused area, thereby completing an AF process.

As described above, according to the one or more various embodiments, a large AF area may be set in an imaging device, and focus may be detected throughout an imaging device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An imaging device including 2-dimensionally arranged pixels for receiving light, the imaging device comprising:
    a first area configured to detect only a horizontal phase difference based on horizontal phase difference information obtained from pixels configured to detect the horizontal phase difference;
    a second area configured to detect only a vertical phase difference based on vertical phase difference information obtained from pixels configured to detect the vertical phase difference; and
    a third area configured to detect horizontal and vertical phase differences based on horizontal phase difference information and vertical phase difference information obtained from pixels configured to detect the horizontal and vertical phase differences,
    wherein the first area is adjacent to a horizontal border of the third area,
    wherein the second area is adjacent to a vertical border of the third area, and
    wherein the third area is located at a center of the imaging device so as to be surrounded by the first and second areas.

2. The imaging device of claim 1, wherein the horizontal phase difference detecting pixels and the vertical phase difference detecting pixels are arranged in the third area.

3. The imaging device of claim 1,
wherein the horizontal phase difference detecting pixels and the vertical phase difference detecting pixels are arranged throughout the imaging device, and
wherein the first area, the second area, and the third area are set based on performing at least one of a horizontal correlation calculation and a vertical correlation calculation.

4. The imaging device of claim 1, wherein a horizontal phase difference detecting pixel and a vertical phase difference detecting pixel are embodied at a same pixel.

5. The imaging device of claim 4, wherein each of the horizontal phase difference detecting pixel and the vertical phase difference detecting pixel comprises four photo diodes.

6. The imaging device of claim 5,
wherein the horizontal phase difference detecting pixel comprising the four photo diodes is configured to detect both the horizontal phase difference and the vertical phase difference, and
wherein the vertical phase difference detecting pixel comprising the four photo diodes is configured to detect both the horizontal phase difference and the vertical phase difference.

7. A method of focusing an image by an imaging device including 2-dimensionally arranged pixels for receiving light, the method comprising:
determining a location of a main object included in an image to be captured;
determining a location of a small multi-focus area based on the location of the main object;
updating the location of the main object according to the small multi-focus area;
operating a lens of the imaging device to focus the location of the main object according to the small multi-focus area;
marking the focused location of the main object; and
storing the image to be captured based on the marked focused location of the main object.

8. The method of claim 7, wherein the updating of the location of the main object comprises:
executing a small main object tracking algorithm with respect to small blocks of the small multi-focus area in order to determine the location of the main object according to the small multi-focus area.

9. A method of focusing an image by an imaging device including 2-dimensionally arranged pixels for receiving light, the method comprising:
determining a location of a main object included in an image to be captured;
determining a location of a small multi-focus area based on the location of the main object;
updating the location of the main object according to small multi-focus area;
operating a lens of the imaging device to focus the location of the main object according to the small multi-focus area; and
marking the focused location of the main object,
wherein the determining of the location of the main object included in the image to be captured comprises:
determining blocks of an entire multi-focus area of the image to be captured;
executing a focus calculation for each of the blocks of the entire multi-focus area;
determining the location of the main object by performing a multi-area calculation based on the focus calculation for each of the blocks; and
storing the location of the main object.

* * * * *